No. 668,377. Patented Feb. 19, 1901.
A. S. KOCH.
JEWELER'S HAND VISE.
(Application filed Dec. 15, 1900.)
(No Model.)

Witnesses
Robert Everett.
J. G. Meyers

Inventor
Alfred S. Koch.
By Andrew R. Brown
Atty.

THE NORRIS PETERS CO., PHOTO-LITHO., WASHINGTON, D. C.

UNITED STATES PATENT OFFICE.

ALFRED S. KOCH, OF LANCASTER, PENNSYLVANIA.

JEWELER'S HAND-VISE.

SPECIFICATION forming part of Letters Patent No. 668,377, dated February 19, 1901.

Application filed December 15, 1900. Serial No. 39,947. (No model.)

*To all whom it may concern:*

Be it known that I, ALFRED S. KOCH, a citizen of the United States, residing at Lancaster, in the county of Lancaster and State of Pennsylvania, have invented certain new and useful Improvements in Jewelers' Hand-Vises; and I do hereby declare the following to be a full, clear, and exact description of the invention, such as will enable others skilled in the art to which it appertains to make and use the same.

My invention relates to a hand-vise more especially intended for use of jewelers in the repair of brooches or other pins and similar articles of jewelry, but adapted also to like purposes in securely holding a piece of work to be operated upon.

It is a principal object of the invention to provide an improved and easily-manipulated gripping implement that can be conveniently held and operated with one hand, so as to leave the other hand free for adjusting the work and for holding any other tool that may be required.

The invention is illustrated in the annexed drawings, in which—

Figure 1:
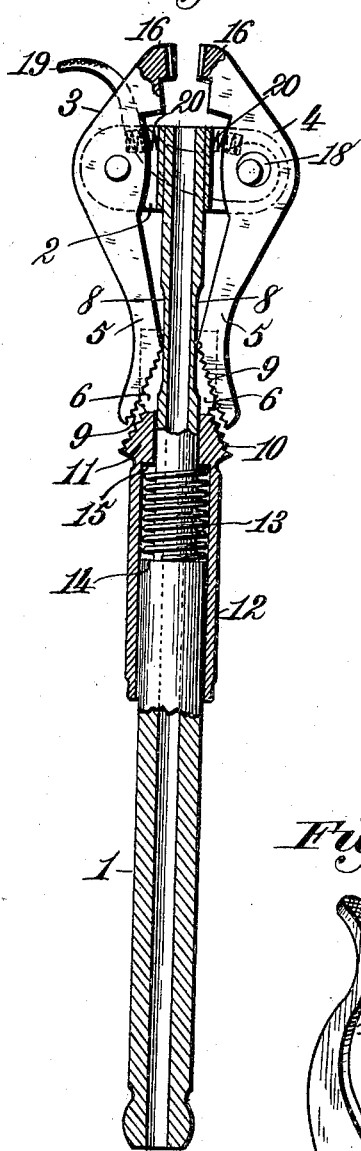
Figure 2:
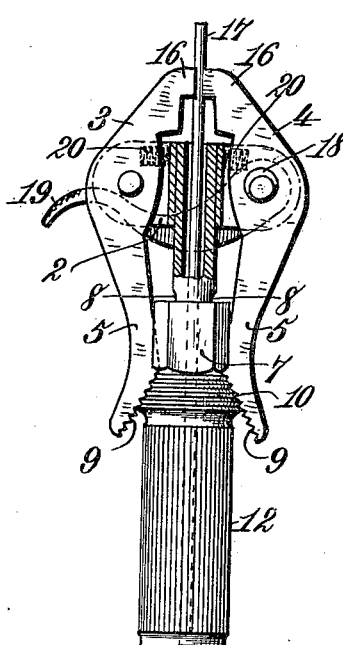
Figure 3:
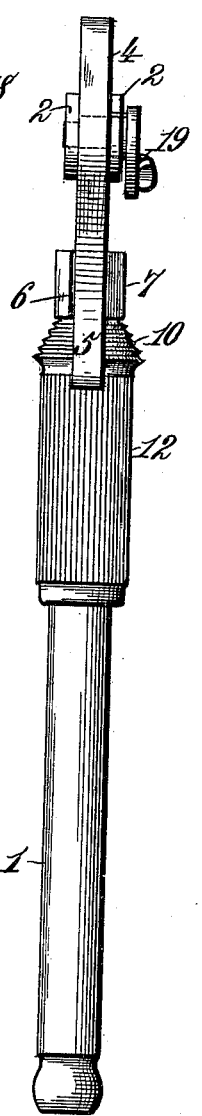
Figure 4:
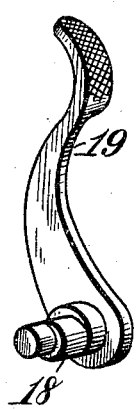

Figure 1 represents, on a somewhat enlarged scale, a part-sectional elevation of my improved hand-vise, showing the jaws of the same open. Fig. 2 is a similar view showing the vice-jaws closed onto the work—such as a rod, piece of wire, or a pin-shank. Fig. 3 is an edge view of the implement in elevation and at right angles to the preceding figures. Fig. 4 is a view of the locking eccentric or cam and its lever.

The tool-handle 1 is preferably tubular, open at both ends, and may thus receive a portion of the length of a pin or other object to be held, or it will permit passage of a rod or wire to be gripped by the vise-jaws. On the upper end of the handle there is a crosshead 2, in the ends of which are pivoted the jaws 3 and 4, that are to grip and hold the piece of work. The shanks 5 of these jaws 3 and 4 are curved inward toward each other, as shown in Figs. 1 and 2, and are received in vertical grooves 6, Figs. 1 and 3, formed in opposite sides of a slide-block 7, that is located on the tool-handle between the said jaw-shanks. A portion of the tool-handle is preferably formed on opposite sides with longitudinally-extended concaves 8, so that the inwardly-curved portion of the jaw-shanks can approach closely to said handle when the slide 7 is drawn downward, as shown in Fig. 1.

Below their inwardly-curved portions the jaw-shanks 5 are flared outward to provide diverging shank ends, which are formed on their inner faces with series of transverse serrations or corrugations 9, that correspond with annular corrugations 10 on a cone 11, through which the slide-block 7 is connected with a sleeve 12, that is located on the tool-handle below the jaw-shanks. The slide 7, cone 11, and sleeve 12 are formed in one piece and are capable of a sliding movement on the tool-handle, as shown.

Within the sleeve 12 there is a coiled spring 13, Fig. 1, which surrounds a reduced portion of the tool-handle, between a shoulder 14 on said handle and another shoulder 15 at the top of the sleeve. This spring 13 normally forces upward the sleeve 12, cone 11, and slide-block 7, so that by upward movement of said cone between the diverging ends of the jaw-shanks 5 said shanks will be forced apart, thereby bringing together the upper or clamping ends 16 of the vise-jaws 3 and 4, so as to cause them to grip a rod, pin, or other object, as 17, Fig. 2, which may have to be held in the vise.

When the cone 11 is in its upward position between the jaw-shanks, it is held not only by expansion of the spring 13, but also by engagement of the cone-corrugations 10 with the corrugations 9 of the shank ends, so that the said cone 11 and attached slide-block 7 cannot slip downward or be jarred out of place.

For the purpose of providing an additional lock for the vise-jaws to insure a firm and secure grip on the article to be held there is a cam or eccentric 18, Figs. 1, 2, and 4, which is located in the vise-jaw 4, on the pivot of said jaw, one end of the said pivot being provided with a finger-piece or short lever 19, through which the said cam-lock is to be operated for locking and unlocking the vise.

In the inner face of each vise-jaw above its pivot there is seated one end of a spiral spring 20, the other end of each spring being provided with a bearing in the cross-head to which the vise-jaws 3 and 4 are pivoted. The springs 20 are so arranged as to open the vise automatically when the slide 7, cone 11, and sleeve 12 are drawn downward, the cam-lever 19 having been first lifted sufficiently to unlock the vise-jaws.

In using this hand-vise it can be very conveniently held in the left hand with the end of the handle resting in the palm. Then after lifting the cam-lever 19 sufficiently the slide 7, cone 11, and sleeve 12 can be readily drawn downward by means of the thumb and forefinger of the hand in which the tool is held. Obviously the corrugated surface of the cone 11 will afford a convenient hold for the thumb and finger of the operator in drawing said cone downward. The slide 7 being provided with grooves 6, engaging the jaw-shanks 5, will thus prevent the slide and cone from turning on the tool-handle. As soon as the cone and slide are drawn downward the springs 20 will automatically open the gripping-jaws 16, thereby permitting insertion of the piece of work to be held and its adjustment to required position in the vise. Now by releasing the downward pull on the cone 11 it will be immediately forced upward by the spring 13, thus spreading apart the lower ends of the jaw-shanks 5, so that the clamping portions 16 of the vise-jaws will be caused to grip the work. If desired, the gripping or clamping surfaces may be grooved or otherwise roughened to take a firm hold on the article. When the work is in place between the closed vise-jaws, the said jaws may be locked by pushing downward the cam-lever 19, as shown in Fig. 2, so that the article to be operated upon will be held firmly in its required position.

What I claim as my invention is—

1. In a hand-vise, the combination with a handle, and pivotally-supported vise-jaws, of a sleeve longitudinally slidable on said handle and carrying at one end a cone to normally spread apart the shanks of the vise-jaws and thereby close the gripping-surfaces of said jaws, a spring located in said sleeve for forcing said cone between the jaw-shanks, and springs located in the vise-jaws above the pivots thereof to open said jaws on retracting the said cone, substantially as described.

2. In a hand-vise, the combination with a handle, and pivotally-supported vise-jaws, of a sleeve longitudinally slidable on said handle and carrying at one end a cone to normally spread apart the shanks of the vise-jaws, means for preventing the turning of said sleeve and cone, a spring located in said sleeve for normally forcing said cone between the jaw-shanks, to close the gripping-surfaces of said jaws, a cam-lock for the closed vise-jaws, and springs to open said jaws on releasing the said lock and retracting the cone, substantially as described.

3. In a hand-vise, the combination with a handle, and pivotally-supported vise-jaws having diverging shank ends provided on their inner faces with transverse corrugations, of a sleeve longitudinally slidable on said handle and provided at one end with a cone having annular corrugations on its surface to engage the corrugations of the jaw-shanks, a spring located in said sleeve for forcing said cone between the corrugated diverging ends of the jaw-shanks, to close the vise-jaws, and springs to open said jaws on retracting the cone, substantially as described.

4. In a hand-vise, the combination with a handle, and pivotally-supported vise-jaws having diverging shank ends provided on their inner faces with transverse corrugations, of a sleeve longitudinally slidable on said handle and provided at one end with a cone having on its surface annular corrugations to engage the corrugations of the diverging shank ends, a slide-block carried by said cone and having grooves to engage and slide on the jaw-shanks, and a spring located in said sleeve for forcing said cone between the diverging ends of the jaw-shanks to close the vise-jaws, substantially as described.

5. A hand-vise, comprising a tubular handle having a cross-head at one end, vise-jaws pivotally supported in said cross-head and provided with diverging shank ends, a sleeve longitudinally slidable on the handle and provided with a cone to normally spread apart the jaw-shanks and thereby close the vise-jaws, a spring located in said sleeve for forcing said cone between the jaw-shanks, means for locking the closed jaws of the vise, and springs to open the vise-jaws, substantially as described.

In testimony whereof I affix my signature in presence of two witnesses.

ALFRED S. KOCH.

Witnesses:
JOHN H. MYERS,
S. Z. MOORE.